United States Patent [19]

Grot

[11] Patent Number: 5,281,680

[45] Date of Patent: Jan. 25, 1994

[54] POLYMERIZATION OF FLUORINATED COPOLYMERS

[75] Inventor: Walther G. Grot, Chadds Ford, Pa.

[73] Assignee: E. I. Du Pont de Nemours and Company, Wilmington, Del.

[21] Appl. No.: 4,620

[22] Filed: Jan. 14, 1993

[51] Int. Cl.⁵ .............................................. C08F 12/30
[52] U.S. Cl. ..................................... 526/243; 526/206
[58] Field of Search ........................................ 526/243

[56] References Cited

U.S. PATENT DOCUMENTS

| | | | |
|---|---|---|---|
| 3,282,875 | 11/1966 | Connolly et al. | 260/29.6 |
| 4,116,888 | 9/1978 | Ukihashi et al. | 521/31 |
| 4,209,635 | 6/1980 | Munekata et al. | 560/183 |
| 4,298,699 | 11/1981 | Asawa et al. | 521/31 |
| 4,320,205 | 3/1982 | Asawa et al. | 521/38 |
| 4,324,876 | 4/1982 | Matsuura et al. | 526/124 |
| 4,326,046 | 4/1982 | Miyaka et al. | 525/276 |
| 4,337,137 | 6/1982 | Ezzell | 204/252 |
| 4,341,685 | 7/1982 | Miyake et al. | 524/104 |
| 4,358,412 | 11/1982 | Ezzell et al. | 260/968 |
| 4,360,601 | 11/1982 | Copeland et al. | 521/27 |
| 4,578,512 | 3/1986 | Ezzell et al. | 562/586 |

FOREIGN PATENT DOCUMENTS

| | | | |
|---|---|---|---|
| 0289869 | 4/1988 | European Pat. Off. | C08F 214/18 |
| 60-250009 | 12/1985 | Japan | 526/243 |
| 63-48314 | 3/1988 | Japan | 526/243 |
| 38762 | 6/1992 | Japan | C08F 259/08 |
| 1286859 | 11/1969 | United Kingdom | C08F 35/0045 |

Primary Examiner—Joseph L. Schofer
Assistant Examiner—N. Sarofim
Attorney, Agent, or Firm—Cary A. Levitt

[57] ABSTRACT

The invention is a process for the nonaqueous polymerization of tetrafluoroethylene with functional fluorinated comonomers. The process uses low TFE to comonomer ratios to form copolymers with high molecular weight and low melt flow. The copolymers are useful as membranes in electrolytic cells or fuel cells.

9 Claims, No Drawings

POLYMERIZATION OF FLUORINATED COPOLYMERS

FIELD OF THE INVENTION

The present invention relates to a process for producing a fluorinated copolymer having ion exchange groups and the copolymer made therefrom. More particularly, this invention is concerned with the nonaqueous bulk or solution copolymerization of tetrafluoroethylene ("TFE") with various functional perfluorinated comonomers $CF_2=CFOCF_2CF(CF_3)OCF_2CF_2SO_2F$ (referred to herein as "(A)") and/or $CF_2=CFOCF_2CF_2SO_2F$ (referred to herein as "(B)") to form polymers with high molecular weight, low TFE to comonomer ratios and low melt flow. Such polymers are useful as films or membranes in electrolytic cells such as chloralkali cells and fuel cells. The films or membranes exhibit low electrical resistance and good physical properties.

BACKGROUND OF THE INVENTION

It is known to produce ion exchange membranes for use in electrolytic cells or fuel cells. The ion exchange membranes partition the cathode compartment from the anode compartment and do not substantially pass the electrolyte and selectively pass ions.

Ion exchange membranes are conventionally fabricated from fluorinated polymers with carboxylic acid groups or sulfonic acid groups as the ion exchange group. The present invention deals only with the production of fluorinated polymers having sulfonic acid groups.

The fluoropolymer containing sulfonic acid groups has excellent heat resistance and chemical resistance (alkali resistance, acid resistance, chlorine resistance, etc.). For example, the fluoropolymer is substantially inactive to the electrolysis and the electrolyzed products in an alkali electrolysis and further has substantially impermeability to liquid and gas, which makes possible the long stable operation.

Membranes made from sulfonic-acid type fluorinated copolymers should have physical integrity and strength commensurate with the physical demands of the device in which they will be used. In electrochemical devices, such as electrolytic cells, physical demands on the membrane vary, depending upon the type of cell and the configuration of the cell. For example, in some cells, electrodes (anodes and cathodes) are spaced substantially apart from each other and have the membrane placed between the two electrodes. In such cell configurations, the membrane functions, more or less, as a free-standing film. Such free-standing membrane films are commonly reinforced to increase their strength. Reinforcement materials which are commonly used include a variety of materials in the form of woven scrims and randomly-dispersed fibers. However, even when supported, the membrane must still have certain minimum levels of physical integrity. Otherwise, it breaks apart and looses its utility.

Physical integrity of ionic fluoropolymers is determined, to a large degree, by the amount of water or solvent the fluoropolymers contain. Thus, a sulfonic fluoropolymer that swells excessively because it absorbs substantial amounts of water or solvent tends to become gel-like and loses much of its physical integrity, relative to an unswollen sulfonic fluoropolymer. The level of swelling (the level of water absorption) for a particular ionic fluoropolymer is also determined by the temperature and the environment. The physical integrity of the membrane may be predicted by measuring its melt flow; i.e., membranes with low melt flow have greater physical integrity.

Another matter of concern in defining usefulness of sulfonic fluoropolymers as membranes is the chemical requirements in a given application. For example, a membrane formed from a sulfonic fluoropolymer in a chloralkali cell has two critical criteria that it should preferably satisfy: electrical conductivity and the ability to reject anions. The sulfonic fluoropolymer chosen for use in such conditions is usually based on a trade-off between the electrical conductivity of the polymer, which is effected by both equivalent weight and water absorption, and the polymer's ability to reject hydroxide ions, which is largely determined by the level of hydration, i.e., the degree of hydration per functional group in the sulfonic fluoropolymer. Under these circumstances, where it is desired to minimize the membrane's passage of hydroxide ions, one chooses a sulfonic fluoropolymer having a higher equivalent weight than a membrane designed to maximize electrical conductivity. Thus, the melt flow of the fluoropolymer may not be the only deciding factor in choosing the fluoropolymer for this particular use.

In general, when the ion exchange capacity is increased, the molecular weight of the fluorinated polymer has been lowered which compromises the physical strength of a film or membrane. Therefore, it would be very advantageous to have fluoropolymers which have high ionic conductivity while yet maintaining physical integrity.

Sulfonic fluoropolymers having equivalent weights less than about 800 are generally useful as films in a variety of electrochemical applications. Below an equivalent weight of about 800, water absorption of the membrane increases and physical integrity of the membrane decreases. Sulfonic fluoropolymers having equivalent weights less than about 750, but usually not less than about 500, are generally useful in applications where ionic conductivity is the prime concern and physical requirements are minimal.

Sulfonic acid copolymers having the desired characteristics may be prepared by polymerization of TFE with various perfluoroolefins containing sulfonic functional groups. Copolymerization of TFE with various perfluoroolefins containing sulfonic functional groups to form polymers which are useful as films or membranes in electrolytic cells is well known in the art. Prior art polymerization methods include solution, aqueous, dispersion, bulk, thermal, and radiation-induced polymerization.

The prior art mentions polymerization of TFE and comonomer (A). For example, the water absorption of a membrane formed from a copolymer of TFE and comonomer (A) having an equivalent weight 1000 in the —$SO_3H$ form which has been boiled in water for 30 minutes is about 45%. The physical integrity of this membrane is poor, especially in the harsh environment of a chloralkali electrolytic cell.

The prior art mentions emulsion polymerization to make a fluoropolymer of TFE and comonomer (B). One reference discloses a copolymer of TFE and comonomer (B) with a ratio of about 3.6 to 1. This polymer has a water absorption of 95%, which is very high compared with that of commercial TFE copolymers, causing the membrane to be tough and elastic. The physical integrity of this membrane is poor. A film at equivalent weight 564, produced from 2.86 to 1 TFE/(B), has a water absorption after boiling in water for 30 minutes of 646%, which results in very low modulus and very poor physical integrity.

The copolymerization of TFE and comonomer (B) by solution (nonaqueous) polymerization has been mentioned but never exemplified in the prior art. At low ratios of TFE to comonomer (B), copolymers made by other polymerization methods have shown very high water absorption.

It is desired to have a film of low melt flow and high molecular weight to provide good physical properties such as durability, tear strength and high modulus. This is particularly desirable for unreinforced films used in fuel cells. Until the present invention, low melt flow and high molecular weight was attainable only at high equivalent weight (which is achieved by using high TFE/(A) or TFE/(B) ratios). These high TFE ratios cause undesirably high ionic resistance. This is a particular disadvantage for fuel cell membranes. It is also desirable to have low resistance, low stickiness, and good tear strength when a fluoropolymer of TFE/(A) or TFE/(B) is used as one or more layers of a membrane in a chloralkali cell.

The present invention provides an advantageous process for producing a fluorinated polymer having sulfonic-acid type ion exchange groups, especially a fluorinated polymer having high molecular weight, high ion exchange capacity, good durability, high strength, low melt flow and low stickiness.

As the result, it has been found that a desired fluorinated polymer can be obtained by copolymerizing a fluorinated olefin and a fluorinated monomer having sulfonic-acid type functional group with or without an inert organic solvent.

SUMMARY OF THE INVENTION

The present invention is a process for the nonaqueous bulk or solution copolymerization of TFE and comonomer $CF_2=CFO(CF_2CF\{CF_3\}O)_nCF_2CF_2SO_2F$, where n=0 or 1. The reaction is performed in a nontelogenic solvent, using 0-70 weight percent solvent, with a soluble initiator, at a temperature suitable for the decomposition of the initiator selected, preferably about 35° C. to 60° C. The solution is agitated at a TFE pressure in the range 280-1100 kPa, using enough comonomer to make a copolymer having a TFE to comonomer ratio of between 3.6 to 1 to 5.6 to 1, resulting in a polymer with equivalent weight of about 800-1000. When no solvent is used, the ratio of comonomer to TFE is 2.1 to 1 to 4.6 to 1, resulting in an equivalent weight of about 650-900 in cases where n=1 and about 484-734 in cases where n=0. The bulk polymerization; i.e., polymerization without any solvent, may advantageously be performed without extraction of the copolymer. The resulting polymers advantageously have a melt flow at 270° C. of less than 30 g/10 minutes.

This process has the advantage of making attractive copolymers for use as a film or membrane in an electrolytic cell or a fuel cell. This resulting membrane has good strength and durability and low electrical resistance.

DETAILED DESCRIPTION OF THE INVENTION

The present invention is a process for the nonaqueous bulk or solution copolymerization of TFE and comonomer $CF_2=CFO(CF_2CF\{CF_3\}O)_nCF_2CF_2SO_2F$, where n=0 or 1. The reaction is performed in a nontelogenic solvent, using 0-70 weight percent solvent, with a soluble initiator, at a temperature suitable for the decomposition of the initiator selected, preferably about 35° C. to 60° C.

The copolymer derived from the solution polymerization has high molecular weight and low melt flow, while maintaining high ion exchange capacity. The equivalent weight of the copolymer is directly dependent on the mole ratio of TFE to comonomer. The following table describes the general relationship of mole ratio of TFE to comonomer to the equivalent weight of the polymer formed from the two sulfonic copolymers of interest:

| Mole Ratio TFE:Comonomer | Equivalent Weight | |
| --- | --- | --- |
| | TFE:A | TFE:B |
| 2.1 | 650 | 490 |
| 3.6 | 800 | 640 |
| 4.6 | 900 | 740 |
| 5.6 | 1000 | 840 |

The actual equivalent weight of the polymer may vary somewhat, depending on reaction conditions.

Because the two monomers in the polymerization step are TFE and a fluorinated sulfonic comonomer, in a conventional polymerization reaction the ratio of TFE to comonomer in the polymerization step determines the ratio of TFE to comonomer in the polymer produced. Furthermore, higher equivalent weight (generally resulting in lower melt flow) occurs when the concentrations of the monomers are increased in the polymerization process.

If a solvent is used in the polymerization, it must be substantially nontelogenic. This means that the solvent contains few enough atoms capable of reacting with the growing polymer, such that the solvent does not reduce the equivalent weight of the final product below the desired range. If a somewhat telogenic solvent is used, the disadvantage can be reduced by using higher monomer concentrations and lower solvent concentrations in the polymerization reaction.

Telogenic activity is just one factor that must be considered in selecting a suitable solvent. Of course, availability, cost, and boiling point (preferably 35°-100° C.) must be considered. Although some examples use a chlorofluorocarbon solvent, it is now strongly preferred that the solvent not be damaging to the ozone layer of the atmosphere, as chlorofluorocarbons are believed to be. In addition, chlorine atoms and hydrogen atoms on an otherwise perfluorinated solvent are not strong telogens, especially if they are not numerous and are terminal chlorine or hydrogen atoms. Similarly, some examples use a perfluorocarbon solvent, but it is now preferred that the solvent not augment the "greenhouse effect," as perfluorocarbons are believed to do. Preferably, the solvent has low toxicity; many perfluoroolefins may be unsatisfactory in this respect. Suitable solvents may include perfluoroalkanes or perfluorocycloalkanes such as perfluoroheptane or perfluorodimethylcyclobutane, or mixtures thereof.

The initiator selected must be substantially nontelogenic, preferably being highly fluorinated or perfluorinated. The initiator must be soluble in the reaction mixture in the polymerization vessel. A common initiator suitable for solution copolymerization of TFE is perfluoropropionyl peroxide, $(CF_3CF_2COO-)_2$. The polymerization initiator may also be a peroxy compound, an azo compound, ultraviolet rays, and ionizing radiation with or without the use of an organic solvent, or combinations thereof.

As in all free radical polymerizations, the temperature of the reaction must be chosen with regard to the half-life of the initiator selected. The reaction temperature for the present process is about 35° C. to 60° C., preferably about 45° C. Pressure of the reaction is not critical and is generally employed to control the ratio of TFE to the comonomer.

The concentration of comonomer in the polymerization vessel is related to the TFE concentration (pressure). The TFE to comonomer ratio in the reaction mixture must be selected to obtain the desired TFE to comonomer ratio in the polymer produced. Furthermore, the concentration of comonomer in the reactor and the concentration (pressure) of TFE will ultimately determine the equivalent weight of the polymer produced. High concentrations of the two monomers will generally cause an increase in the equivalent weight of the polymer produced (i.e., a desirable decrease in the melt flow). However, high concentrations of the two monomers will also increase the reaction rate and the rate of heat evolution.

For polymerization using comonomer (A), the concentration of comonomer (A) is preferably 30-100% of the total weight of (A) plus solvent fed to the reactor. For the polymerization using comonomer (B), the concentration of comonomer (B) is preferably 40-100% of the total weight of (B) plus solvent fed to the reactor. For the purpose of expressing the concentration of comonomer in the total weight of comonomer plus solvent fed to the reactor, the amount of solvent fed to the reactor along with the initiator is ignored, and considered zero. A lower than 30% concentration of (A) gives product of undesirably low equivalent weight. A high percentage of comonomer, especially 100% (or bulk polymerization), causes a high rate of reaction and results in a heat removal problem. In this case a reactor must be used with a low temperature coolant, a large heat exchange area, or the like. Failure to control the heat evolution of the polymerization reaction may result in low yields of the copolymer.

The concentration of TFE is selected to achieve the desired TFE to comonomer ratio in the polymer and the resulting equivalent weight of the copolymer. If TFE concentration (pressure) is too low, the TFE to comonomer ratio will be too low, and the polymerization rate may be undesirably slow. If the concentration of TFE is too high, the ratio TFE to comonomer will be too high and the high polymerization rate can cause difficulty in heat removal, as described above. Suitable TFE pressures are preferably 280-1100 kPa, most preferably 400-800 kPa.

The polymerization vessel is preferably agitated, and must be made of an inert material of construction. Oxygen is preferably removed from the vessel before polymerizing. Advantageously, it is also possible to use the vessel for the homopolymerization of TFE before using it for the copolymerization.

Polymerization may be batch, continuous, or continuous batch until the vessel is full. Fully continuous polymerization is preferred for maximum product uniformity and productivity. Batch polymerization processes are, however, in many cases, less costly and more convenient, especially for smaller scale production of sulfonic fluoropolymers. However, care should be taken to avoid excessive monomer conversion which can result in drift in sulfonic fluoropolymer composition (nonuniform molecular and equivalent weights). Batch polymerization reactions are usually performed by loading all of the fluorosulfonyl comonomer reactant into a reactor and then maintaining a supply of TFE under constant pressure.

Conversion of the fluorosulfonyl monomer into the sulfonic fluoropolymer beyond a conversion level of from 50 to 60 percent and particularly from 80 to 90 percent, can lead to higher equivalent weight sulfonic fluoropolymers being formed in the latter part of the reaction. If the comonomer pressure is reduced during the reaction, sulfonic fluoropolymer fractions with undesirably low equivalent weight can result. Excessively long start-up times for reaching constant temperature and pressure can also result in inconsistent equivalent weight sulfonic fluoropolymers. In general, constant conditions should be maintained throughout the polymerization reaction. In addition, the weight percent polymer in slurry should preferably be <15% to maintain agitation.

The polymerization product may be isolated by flashing off excess TFE. It is then possible to recycle excess TFE, solvent and comonomer or, alternately, distilling off unconverted solvent and comonomer. In one alternative, the unconverted comonomer is washed out of the polymer with solvent, then the solvent and comonomer are separated for recycle.

After polymerization and fabrication of the film or membrane to the desired shape, conversion of the fluorosulfonyl to an ionic form requires hydrolysis. The hydrolysis may be done in a variety of ways, but usually involves the use of caustic soda or potash in water, or a mixture of water and an organic solvent such as alcohols. The pendant group of the sulfonated fluorocarbon is then in the $-SO_3^-Na^+$ form. Cations other than $-Na^+$ can be made to replace the $Na^+$ if practical (such as $-H^+$ or $-K^+$).

In order to determine the strength of the copolymer, the melt flow is measured. The melt flow referred to in this specification and in the claims is determined by measuring the weight of polymer extruded in 10 minutes in a melt indexer built by Custom Scientific Instruments of Whippany, N.J., U.S.A. The parameters of the melt indexer are as follows: piston diameter is 0.373 inches; piston load is 1200 grams; orifice length is 0.315 inches and orifice diameter is 0.0825 inches. The melt index may also be determined by other comparable instruments known in the art. The test is conducted without extraction of the polymer.

If the product has too high a melt flow, most or all of the product can be extracted with a solvent such as the polymerization solvent to remove oligomers (low molecular weight polymers), which decreases the melt flow. Extraction is generally unnecessary at higher TFE to comonomer ratios.

It is believed that the sulfonic fluoropolymers of the present invention have surprisingly good physical properties because the molecular weights are more uniform (molecule to molecule), than the molecular weight of the sulfonic fluoropolymers of the prior art. For the same reason, the sulfonic fluoropolymers of the present invention produce a membrane for electrolysis with surprisingly high current efficiency.

It is also believed that molecular weight, as well as molecular weight distribution, of sulfonic fluoropolymers play a role in the degree to which the sulfonic fluoropolymer will swell, when exposed to water or other polar media. Low equivalent weight sulfonic fluoropolymer fractions are believed to plasticize the sulfonic fluoropolymer and result in increased swelling. Lower equivalent weight sulfonic fluoropolymer fractions are also thought to distort the swelling of the sulfonic fluoropolymer, measured for a given equivalent weight sulfonic fluoropolymer, because of nonlinear swelling that occurs at sufficiently low equivalent weight.

The product can be extruded into a strong, durable film or membrane, free of the stickiness and high water absorption of prior art copolymers while maintaining good electrical conductivity. The fluoropolymer membranes of the present invention can be laminated with other fluoropolymers to form laminated composite films. For example, they can be laminated with fluoropolymer films containing carboxylic ion exchange active groups. Such other films and lamination techniques are well known in the art.

EXAMPLES

At room temperature, into a 1 liter stainless steel autoclave are charged 600 gm comonomer A and 1 ml of a 6% solution of perfluoro propionyl peroxide. In some cases, solvent (F-113 or HFP dimer) is added. The autoclave is purged first with nitrogen, then with TFE and finally pressured with TFE. The autoclave was then heated to 45° C. and the TFE pressure was adjusted. After 3 hours the autoclave was cooled, vented and discharged.

The polymer was recovered from the reaction mixture by boiling off the solvent and unreated monomer, at the end under vacuum. After vacuum drying at 100° C., the polymer is weighed and the melt flow is measured.

Table A reports the equivalent weight and melt flow of polymers made from various concentrations of TFE and comonomer A. Some of the reactions were performed without solvent and others used solvent, as indicated.

The solvent identified as F-113 is 1,1,2 trifluorotrichloroethane. The solvent identified as HFP dimer is perfluorodimethylcyclobutane.

TABLE A

| Example | TFE (kPa) | % COMONOMER in COMONOMER + solvent | Solvent | EW | MF (270° C.) |
|---|---|---|---|---|---|
| 1 | 585 | 100 | — | 670 | * |
| 2 | 620 | 100 | — | 695 | |
| 3 | 690 | 100 | — | 740 | 19 |
| 4 | 655 | 100 | — | 770 | |
| 5 | 895 | 100 | — | 880 | 6 |
| 6 | 825 | 88 | F113 | 870 | 7 |
| 7 | 820 | 76 | F113 | 870 | 7 |
| 8 | 690 | 70 | F113 | 890 | 7.6 |
| 9 | 345 | 30 | F113 | 850 | 30 |
| 10 | 380 | 30 | F113 | 900 | 18 |
| 11 | 390 | 30 | F113 | 990 | 1.5 |
| 12 | 58 | 30 | F113 | 1030 | 0.9 |
| 13 | 60 | 30 | F113 | 1010 | 0.9 |
| 14 | 60 | 30 | HFP dimer | 850 | 36 |
| 15 | 65 | 30 | HFP dimer | 920 | 6 |
| 16 | 70 | 30 | HFP dimer | 928 | 4.5 |
| 17 | 80 | 30 | HFP dimer | 1088 | 0.1 |

*(unmeasurably high)

What is claimed is:

1. A process for the production of fluorinated copolymers comprising the nonaqueous copolymerization of tetrafluoroethylene ("TFE") and a comonomer having the formula $CF_2=CFO(CF_2CF\{CF_3\}O)_nCF_2CF_2SO_2F$, where n=0 or 1, in a solvent which does not substantially influence or limit the equivalent weight of the copolymer in the presence of 0–70 weight percent solvent and a soluble initiator, at a temperature suitable for the decomposition of said initiator, and agitating the TFE and the comonomer at a TFE pressure in the range of about 280–1100 kPa, having a TFE to comonomer ratio of between 2.1:1 and 5.6:1.

2. The process of claim 1 in which the comonomer has n=1.

3. The process of claim 1 in which the weight percent of the solvent is 0.

4. The process of claim 1 in which the copolymer has a melt flow of less than 30 g/10 minutes at 270° C.

5. The process of claim 4 in which the copolymer has a melt flow of less than 20 g/10 minutes at 270° C.

6. The process of claim 1 in which the TFE pressure is 400–800 kPa.

7. The process of claim 1 in which the initiator is a peroxy compound.

8. The process of claim 1 in which the solvent is 1,1,2 trifluorotrichloroethane or perfluorodimethylcyclobutane.

9. The process of claim 1 in which the solvent is a perfluoroalkane, perfluorocycloalkane or mixtures thereof.

* * * * *